July 30, 1929.  F. MILLER  1,722,852
HARMONICA MUSIC HOLDER
Filed Nov. 25, 1927
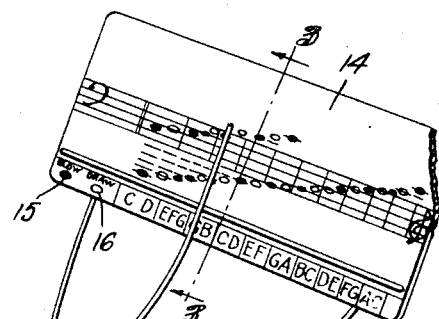
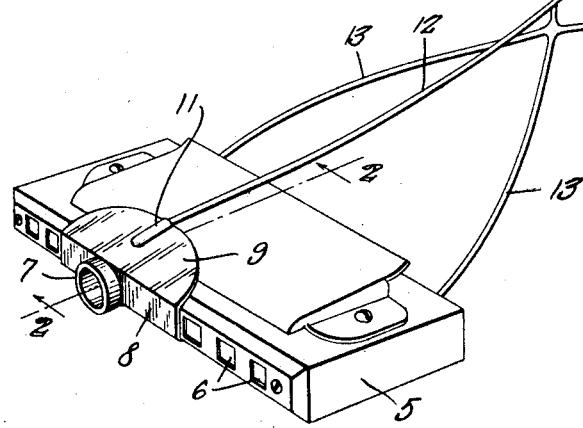
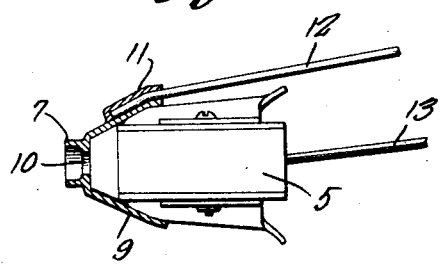
Frank Miller,
INVENTOR
BY Victor J. Evans
ATTORNEY
WITNESS:

Patented July 30, 1929.

1,722,852

UNITED STATES PATENT OFFICE.

FRANK MILLER, OF ELMHURST, NEW YORK.

HARMONICA MUSIC HOLDER.

Application filed November 25, 1927. Serial No. 235,676.

My improvement has reference to an attachment for harmonicas whereby the instrument may be played either by amateurs or a professional in an easy and an accurate manner.

A further object is to provide a mouth piece for a harmonica which is slidably arranged on the instrument and which has its bore registering with the holes in the instrument.

A still further object is the provision of a mouth piece for harmonicas that is slidably arranged on the instrument and which has its bore designed to register with the respective holes in the instrument, a rod or pointer being carried by the mouth piece and being arranged to travel over a key board on which there is inscribed a chart corresponding to the keys of the instrument, so that the performer may play the instrument in a comparatively easy and thoroughly accurate manner.

To the attainment of the foregoing and other objects which will present themselves as the nature of the invention is better understood, the improvement resides in the construction and arrangement of parts, one satisfactory embodiment of which is disclosed by the accompanying drawings.

In the drawings:

Figure 1 is a perspective view illustrating my improvement in applied position.

Figure 2 is a detail sectional view approximately on the line 2—2 of Figure 1.

Figure 3 is a detail sectional view approximately on the line 3—3 of Figure 1.

As is well known in the art, two notes are sounded respectively by blowing and by drawing the breath through the several holes of the harmonica. To successfully play the instrument the performer must acquire the knack of tonguing, that is, of arranging his tongue, (with the instrument between his lips) in such manner as to direct and draw his breath through only single holes. This is a difficult and tedious task and requires long practice before it can be successfully accomplished. Even when the knack is perfected the performer is liable to sound a wrong note by either blowing or drawing his breath when a reverse action is required, and even a skilled performer is very liable to tongue the wrong hole in playing the instrument. With my improvement this type of instrument may be successfully played in an easy and accurate manner by either an amateur or professional. The invention also renders the proper playing of this type of instruments easy for an amateur even if he has no knowledge of music.

In the drawings, a harmonica of an ordinary construction is indicated by the numeral 5. The harmonica is provided with the usual holes 6 in which are arranged the usual reeds, one of which sounds a note when the operator forces his breath through a hole and sounds another note when the operator draws his breath through the said hole.

My improvement includes a substantially tubular mouth piece 7 which is preferably centrally formed on a plate 8 formed with spring flanges 9 that are disposed on the opposite faces of the harmonica 5 and exert a friction thereagainst. The bore of the mouth piece 7 has an inner restricted portion 10 which is designed to register with any one of the openings 6 in the harmonica.

One of the flanges 9 of the body plate 8 for the mouth piece 7 is formed with a socket portion 11 in which is received one end of a rod 12. The rod 12 is rounded rearwardly from the harmonica and merges into a straight end. The rod 12 provides a pointer and will be hereinafter so referred to.

Fixed on the rear of the body of the harmonica 5 there are crossed centrally connected curved arms 13. The outer ends of these arms are straight and are inserted through a plate 14. The plate 14, on its outer face, has inscribed thereon the notes of the scale to which the harmonica is tuned and likewise the key for such scale. Both the key and notes are differently designated as indicated for distinction by the characters 15 and 16. The parts indicated by the characters 15 are differently colored from the parts indicated by the characters 16. When the pointer is disposed over the parts 16, the player of the instrument draws his breath through the mouth piece for sounding the proper note and when the pointer is disposed opposite the part 15 the player blows his breath through the mouth piece and in this manner it will be noted that with my improvement either an amateur or professional may easily and properly play any ordinary construction of harmonica.

The mouth piece renders the playing of a harmonica more sanitary and the arrangement of the mouth piece on the harmonica braces the same and greatly prolongs the life thereof.

Having described the invention, I claim:

The combination with a harmonica having centrally connected upwardly curved crossed rods fixed to the rear edge thereof, and a scale carrying plate fixed to the ends of the rods, of a mouth piece slidably mounted on the harmonica including a plate and having an opening to successively register with the ducts of the harmonica, said plate having an outwardly projecting tubular portion that surrounds the opening therein and having its edges formed with angle flanges which exert a tension toward each other and a frictional engagement against the opposite faces of the harmonica and the upper flange having an integrally formed socket for the reception of a pointer rod that is designed to travel over the scale when the mouth piece is moved on the harmonica.

In testimony whereof I affix my signature.

FRANK MILLER.